United States Patent [19]

Anderson et al.

[11] Patent Number: 4,738,732

[45] Date of Patent: Apr. 19, 1988

[54] SELF CLEANING LIQUID SOLDER FLUX

[75] Inventors: Edward A. Anderson, Yorba Linda; Ernesto S. Sandi, Montebello; James C. Cammarata, Chatsworth, all of Calif.

[73] Assignee: Hughes Aircraft Co., Los Angeles, Calif.

[21] Appl. No.: 10,872

[22] Filed: Feb. 4, 1987

[51] Int. Cl.$^4$ .............................................. B23K 35/34
[52] U.S. Cl. ........................................ 148/23; 148/25
[58] Field of Search ..................................... 148/23–25

[56] References Cited

U.S. PATENT DOCUMENTS 3,748,191 7/1973 Strauss .................................. 148/23
4,360,392 11/1982 Roberts .................................. 148/25

Primary Examiner—Peter D. Rosenberg
Attorney, Agent, or Firm—Mark J. Meltzer; Steven M. Mitchell; A. W. Karambelas

[57] ABSTRACT

A soldering flux, method for fluxing pieces, and method for joining pieces, wherein hydrofluoric acid or an evaporative organic acid is mixed with an evaporative organic solvent to form the flux. Neither precleaning nor postcleaning of the pieces being joined is necessary. The flux evaporates completely upon heating, leaving no corrosive residue or other product on the surface of the piece. The portion of the piece to be bonded is dipped into the flux and immediately tinned, before soldering.

18 Claims, 1 Drawing Sheet

SELF CLEANING LIQUID SOLDER FLUX

BACKGROUND OF THE INVENTION

This invention relates to the joining of materials together, and, more particularly, to joining accomplished by soldering.

Soldering is a metal joining process wherein portions of pieces are joined together by placing a thin layer of a molten metal between the portions being bonded, and permitting the metal to solidify. The usual steps in soldering involve physical cleaning of the surfaces to be joined, applying a solder flux to the surfaces, heating the surfaces to cause the flux to react with oxides and other surface layers, thereby cleaning away these surface impediments to bonding, applying a layer of the molten solder to each surface to wet the surface in a process termed "tinning", contacting the two surfaces together with the solder molten, and finally postcleaning the surfaces to remove any corrosive remnants of the flux. It is important that the molten solder fully wet the surfaces to be joined during the tinning step, as unwet portions result in voids at the surfaces after soldering is complete, and the voids can cause later failure of the bond.

In soldering, usually only the portions to be bonded are heated, and the solder melts at low temperature. In a related process, brazing, usually the entire part is heated, and the braze metal melts at higher temperatures. As used herein, the term "soldering" includes and encompasses both the process usually termed "soldering" as well as the process usually termed "brazing".

The flux and its application are an important part of the soldering process. Solders cannot bond to oxides and contaminants that form barriers at the surfaces of the pieces to be joined. Such surface barriers prevent wetting of the surfaces during tinning, resulting in incomplete bonding. The flux is a chemical substance that contains an ingredient which reacts with oxides and other surface barriers to remove them and inhibit their reformation during the soldering process. With these barriers removed, the liquid solder can flow over and wet the entire surface of the portion to be joined during tinning. Once such wetting is accomplished, the actual joining of the two components is readily completed.

The surface to be fluxed must ordinarily be cleaned of a portion of the oxide and contaminant coating prior to fluxing. Equally importantly, the soldered array must be carefully cleaned after soldering is complete, in a postcleaning process, to remove any unreacted flux and reaction products of the flux treatment. Any remaining flux or reaction products can continue reacting with the bonded pieces and corrode them during service. Such corrosion caused by fluxes is a major concern for many types of solder bonding, as the bonded pieces are sometimes used in environments having conditions such as high humidity and high temperature that accelerate corrosion reactions that might otherwise proceed slowly. Tiny amounts of unreacted flux or reaction products that remain on the surface following soldering and postcleaning can therefore have disastrous consequences.

The problems of attaining good soldered joints and the consequences of failures are keenly felt in the electronics industry. Even with the advent of integrated circuit technology, soldering is widely used in assembling electronic devices. A large, complex electronic device may contain thousands of solder joints. These solder joints must function both to structurally join pieces and to carry electrical currents. Failure of any one of the joints, either because of poor wetting and bonding of the solder or because of corrosion, can result in failure of the device. The electronic devices are often placed or used in inaccessible locations, so that a failed solder joint cannot be readily repaired.

The soldering operation itself is challenging when applied to electronics. The pieces being joined are often small, making cleaning, tinning, postcleaning and inspection difficult. In some cases, portions of the electronic components are damaged by overheating, and only the lead portions to be joined can be heated during soldering. Cleaning and postcleaning are difficult due to the small sizes of the components, their large numbers, and the potential damage to the electronics by the cleaning solutions used, if any. Entire production line shutdowns due to problems in the joining operation are not uncommon, and such problems are often traceable to the fluxes used and the cleaning, postcleaning, and application steps associated with fluxing.

Because of the consequences of solder failures and the significance of solder joints, the soldering process has been studied extensively. Various fluxes have been developed, but the natural rosin familiar to home hobbyists is still most commonly used in production soldering operations. Natural rosin is extracted from pine tree sap, and contains a mixture of chemicals that effectively react to remove many oxides and contaminants at surfaces. Studies of the content of natural rosins have led to the development of various synthetic fluxing agents, which usually perform functions similar to those of natural rosins, but without the side effects. However, most effective fluxing agents require extensive cleaning and post cleaning, as they leave residue or reaction products that can lead to corrosion of the portions bonded.

Fluxes now in use include mixtures of inorganic acids in inorganic vehicles or solvents such as water, inorganic acids in petrolatum pastes, salts in water, petrolatum paste or organic solvent, organic acids in water, organic solvents or petrolatum paste, organic halogens in water, organic solvents, or petrolatum paste, amines and amides in water, organic solvents, or petrolatum paste, and natural or modified rosins. All of these fluxes require postcleaning of the soldered joint. Fluxing can also be carried out in a reducing environment, as by accomplishing the soldering process in a hydrogen gas atmosphere. Postcleaning is not required, but maintenance and use of a pure hydrogen atmosphere in large-scale production operations is difficult, and can lead to related hydrogen embrittlement. In sum, there is known no effective, generally applicable approach to fluxing which avoids the need for postcleaning of the soldered parts.

There exists a need for an improved approach to soldering, and particularly to the fluxing operation, which increases the reliability of the joining process by promoting effective wetting of the solder to the piece during the tinning step, and also reduces the incidence of post-soldering failures due to corrosion or related causes. Preferably, such an approach would be accomplished through a relatively simple sequence of soldering steps, and in a manner that is both environmentally acceptable and also does not require special precautions to protect the health and productivity of production line workers. The present invention fulfills this need, and further provides related advantages.

SUMMARY OF THE INVENTION

The present invention provides a solder flux, and related method for fluxing a surface and for joining two pieces together using the flux. The flux promotes even, smooth, regular wetting of the surface of the piece by solder, with a virtual absence of unwetted portions. Use of the flux does not require cleaning of the surface prior to fluxing or postcleaning of the bonded portions of the pieces after soldering is complete. The flux evaporates entirely during the fluxing process, leaving no residue or reaction products to interfere with the use of the bonded components, or cause corrosion or other harmful post-bonding effects. At ambient temperature, the flux is a liquid having a viscosity comparable with that of water, and can be readily provided in open containers at the point of use. The vapors from many embodiments of the flux are not odorous and offensive to persons who use the flux, and contact of the flux to the body does not cause injury. The flux can therefore be used in assembly operations involving hand labor without special precautions such as required with some other fluxes.

In accordance with the invention, a soldering flux consists essentially of a mixture of an evaporative organic solvent and an acid selected from the group consisting of hydrofluoric acid and an evaporative organic acid, the acid being present in an effective amount less than the solubility limit in the evaporative organic solvent. The preferred approach is a mixture of hydrofluoric acid and an evaporative organic solvent. In one preferred approach using hydrofluoric acid and no other ingredients besides the solvent, the acid is present in an amount within the range extending from the minimum of about 1 part acid to 46 parts of evaporative organic solvent, up to a maximum of the solubility limit of hydrogen fluoride in the solvent. (All amounts expressed in parts herein are parts by volume, unless otherwise indicated.) Additions of other acids can reduce the minimum effective amount of hydrofluoric acid to about 0.5 parts acid to 46 parts evaporative organic solvent. It is found, in most cases, that full fluxing effectiveness is attained at an acid level of about 2 parts of hydrofluoric acid to 46 parts of the evaporative organic solvent. Greater amounts of the acid are normally not used for safety reasons.

An acceptable hydrofluoric acid is a commercially available reagent grade mixture of about 49 percent by volume hydrogen fluoride in water. Reagent grade acid is not required, but the acid must be free of harmful impurities that would remain on the surface of the piece being bonded, after the remainder of the flux has evaporated. The evaporative organic solvent is an organic compound that is a liquid which forms a solution with the hydrofluoric acid, and evaporates from the surface of the component during the bonding operation along with any unreacted hydrofluoric acid and any reaction products, in the time required for fluxing and tinning. An acceptable evaporative organic solvent is ethyl alcohol.

In the past, strong inorganic acids such as hydrochloric and hydrobromic acids have been incorporated into certain synthetic organic acids, which are then processed into esters for use in fluxes. However, hydrofluoric acid has been generally considered too strong an acid for widespread use in fluxes, because tiny amounts of residues could cause serious corrosion damage, and because the hydrofluoric acid attacks glass and ceramics used in many electronic components. Hydrofluoric acid has occasionally been used in water and petrolatum mixtures, but such use has been restricted due to the activity of the acid. Careful postcleaning of pieces bonded with a flux containing a strong inorganic acid such as hydrofluoric acid has been required, with hot water and neutralization of the residual acid by a base, with organic solvents, or otherwise.

It has now been found that hydrofluoric acid effects the fluxing operation when mixed with an evaporative organic solvent. The flux of the invention is applied to the surface to be fluxed by briefly immersing the surface into the flux, spraying the flux onto the surface, or by other convenient means. The surface is then tinned by dipping the surface into liquid solder, brushing the liquid solder onto the surface, or other convenient means.

When the flux of the invention is used, the surface to be fluxed and bonded need not be specially cleaned prior to application of the flux. The surface should not have grease, thick dirt, or other impenetrable barrier that prevents contact of the liquid flux to the surface. Electrical components are typically supplied by manufacturers without such barriers. It is not necessary to clean a major portion of the oxide from the surface to be fluxed, prior to application of the flux. It is also not necessary to conduct postcleaning operations to clean residue and reaction products from the surface and surrounding areas, after soldering is complete. Residual flux and reaction products evaporate from the surface and surrounding areas, so that substantially no hydrogen fluoride remains to cause corrosion.

If desired, other ingredients may be added to the flux mixture of hydrofluoric acid and evaporative organic solvent, as long as the additions do not interfere with the effectiveness of this mixture. Inorganic acids such as hydrochloric acid, hydrobromic acid, and hydroiodic acid can be added, either singly or in combination. Organic acids such as t-crotonic acid and formic acid may be added, either singly or in combination. Additions of these acids have the effect of reducing the required minimum effective amount of hydrofluoric acid that must be present in this embodiment. A variety of evaporative organic solvents are presently known to be operable in addition to ethyl alcohol, such as isopropyl alcohol, methyl alcohol, tetrahydrofuran, acetone, ethyl acetate, an azeotrope of trichlorotrifluoroethane and 5 percent of ethyl alcohol known as Freon TE, ethyl formate, a mixture of trichloroethane and methylethylketone known as TMEK, hexane, methylene chloride, isoamyl acetate, benzene, toluene, cyclohexanone, and mixtures thereof. Reodorants can be added in small amounts to suppress objectionable odors, if any. However, many fluxes produced in accordance with the invention are without objectionable odor, and it is not necessary to choose combinations of ingredients that have objectionable odors to have an operable flux.

In the other aspect of the invention, an evaporative organic acid is mixed with an evaporative organic solvent to form a flux. The evaporative organic acid must be present in an effective amount, which is typically in the range of from about 1 part of acid to 46 parts of solvent, up to the solubility limit of the acid in the solvent. Full fluxing effectiveness is normally reached with about 1 part of the acid for 50 parts of the solvent. However, the general level of effectiveness reached using evaporative organic acids is less than that reached using hydrofluoric acid, and therefore the flux mixture of hydrofluoric acid and evaporative organic solvent is preferred. Acceptable evaporative organic solvents include those discussed previously. Acceptable evaporative organic acids are those that evaporate fully at the fluxing temperature when mixed with the solvent. t-crotonic acid is especially preferred in this embodiment, as it sublimes upon heating. However, t-crotonic acid has a particularly strong odor, and requires the use of reodorants in most situations. Inorganic acids such as hydrofluoric acid, hydrochloric acid, hydrobromic acid, and hydroiodic acid can be added, either singly or in combination.

A method for fluxing the surface of a portion of a piece comprises furnishing the piece to be fluxed, and contacting the surface of the piece with a flux as set forth previously. A method for joining portions of two pieces comprises furnishing the two pieces to be joined, contacting the portions to be joined with a flux as set forth previously, applying a metallic solder to at least one of the portions to be joined, and contacting the two portions to be joined at a temperature above the melting point of the metallic solder and then cooling the contacted portions to a temperature below the melting point of the metallic solder, thereby joining the contacted portions together.

A wide variety of types of pieces can be fluxed and joined by the processes of the invention. Conventional electronic components such as resistors, diodes, capacitors, transistors, integrated circuits, and the like are included. Subassemblies can be formed or joined. Wires, connectors, printed wiring boards, and the like can be joined together or with active components. The processes are also operable in conjunction with non-electronic soldering operations, such as general metal joining, fabrication, and the like. There are no known limitations on such uses of the flux.

It will now be appreciated that the present invention presents an important advance in the art of soldering and fluxes. The flux of the invention is highly effective in promoting wetting of the portions of components to be joined by solder, producing an evenly tinned surface. The flux and its reaction products evaporate substantially completely by the conclusion of the fluxing operation, so that postcleaning is not required even though the flux contains a strong acid. The flux is easy to use in fluxing the surfaces and in bonding components. It is not dangerous to contact to the skin, and does not have an objectionable odor, so that the flux can be used in mass production soldering operations.

Other features and advantages of the invention will be apparent from the following more detailed description, taken in conjunction with the accompanying figures, which description illustrates, by way of example, the principles of the invention.

DETAILED DESCRIPTION OF THE PREFERRED EMBODIMENT

The present invention is embodied in a flux used in conjunction with soldering. The flux preferably is a mixture of hydrofluoric acid and an evaporative organic solvent, with the ratio of acid and solvent being from about 1 to about 10 parts of hydrofluoric acid for each 46 parts of evaporative organic solvent. While greater proportions of acid are operable, completely effective results are obtained with less than about 10 parts of acid, and there is less danger from acid burns. Preferably, the solvent is ethyl alcohol. In one embodiment, the ratio of hydrofluoric acid to ethyl alcohol is 2 parts hydrofluoric acid to 46 parts of ethyl alcohol. Both the hydrofluoric acid and the ethyl alcohol should be without impurities that would not evaporate during fluxing.

A flux having reagent grade hydrofluoric acid provided as an aqueous solution of 49 percent hydrogen fluoride, and reagent grade ethyl alcohol, mixed in the ratio of 2 parts by volume of hydrofluoric acid to 46 parts by volume of ethyl alcohol, is the presently most preferred embodiment of the invention. This flux mixture is prepared by adding the required volume of hydrofluoric acid slowly to the ethyl alcohol, taking care not to splatter the acid or overheat the solution. Concentrated hydrofluoric acid is potentially dangerous, as it is a very strong acid that rapidly attacks human tissue. Consequently, the preparation of the flux mixture should be accomplished by a person skilled in making acid mixtures, using good ventilation and appropriate safety equipment including at least goggles, a rubber apron, and rubber gloves.

Once the flux mixture is prepared, the concentration of hydrofluoric acid is sufficiently low that there is a greatly reduced risk of injury. The flux mixture can be contacted to the skin for brief periods without burns or injury, although it is recommended that any flux touching the skin be washed away as soon as is reasonably possible. Nevertheless, the flux mixture is much safer than many other commercial liquid fluxes, which quickly burn the skin. The dominant odor of the flux is that of the solvent, in the preferred case the ethyl alcohol. While prolonged exposure to this odor is not recommended, exposure to a weak odor or for brief periods is not immediately harmful. Thus, the flux is safe to handle in ordinary conditions of good ventilation and a reasonably safe working environment.

Figure 1:
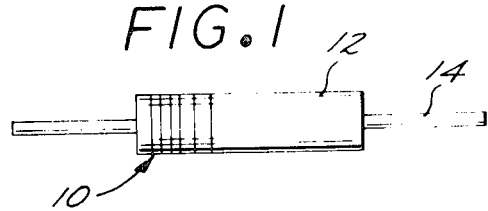
FIG. 1 is a plan view of an electronic component.

An example of a piece 10 to be fluxed, tinned, and joined to another piece is shown in FIG. 1. The piece 10 selected for illustration is a resistor 12, but pieces that may be joined include a transistor, capacitor, diode, integrated circuit, flat pack, integrated circuit, printed circuit board, wire, and the like. The piece 10 has leads 14 extending therefrom, and the leads 14 are the portions of the piece 10 to be bonded. The leads 14 can be made of uncoated metals such as copper, invar or kovar, or of coated metals such as tin coated on copper, gold coated on copper, gold coated on kovar, gold coated on invar, and the like. The present invention has been found to be operable with all of these enumerated types of lead materials, and there is no known limitation on the types of leads that may be fluxed with the invention.

To flux the leads 14, the lead is dipped into the flux made as previously described, for a period of time of about one second, which is the period of time required to dip the lead by hand into the solution and remove it.

Longer fluxing times have been tried, and found operable. There is no known limitation on the time for exposing the lead to the flux. Significantly, it is not necessary to clean or preclean the lead 14 prior to immersion in the flux. Small amounts of grease or other organic contaminants are dissolved in the evaporative organic solvent. Excessively large amounts of organic contaminants on the leads should be removed by wiping prior to dipping into the flux. It is also not necessary to clean a portion of the oxide and other surface layers from the lead prior to dipping into the flux, as has been commonly practiced with prior fluxes. With the prior fluxes, the lead is cleaned with a brush, sandpaper, or the like prior to applying a flux, and this is not required in conjunction with the present invention. Again, if large amounts of scale, rust, or the like were present, they should be scraped off. However, leads of electronic components received from the manufacturer typically have only minor amounts of organic surface contamination and the amount of oxide on the surface resulting from normal oxide growth, and it is not necessary to clean these leads before dipping into the flux.

After the lead 14 is removed from the liquid flux, it is immersed in the molten solder, typically at a temperature of about 500° F. for conventional 63:37 tin:lead solder, and preferably with a gentle swirling or stirring motion to ensure uniform contact with the molten solder. (Often, care is taken that only the lead 14, and not the electronics package such as the resistor 12, is heated, as the electronics package may be damaged by exposure to excessively high temperatures.) At this temperature, the flux reacts with the oxides and other surface layers on the lead to remove them as an impediment to wetting of the lead 14 by the solder. The exact mechanism of this reaction is not presently known. Also at this temperature, the flux evaporates from the lead 14, along with any volatile reaction products. Analytical studies by EDAX techniques have not detected any residual fluoride or fluorine on the completed piece. Accelerated corrosion tests conducted on finished soldered parts have not produced corrosion in parts joined using the flux of the invention. Another important advantage of the present invention is that the flux and its evaporant do not attack the electronics package, as might otherwise be expected for a mixture containing hydrofluoric acid. The electronics package often includes glass or ceramics, which are attacked by concentrated hydrofluoric acid.

The lead 14 is then tinned, by the contacting to the lead 14 of a liquid solder maintained at a temperature above the melting point of the solder. The present invention has been found applicable for use with lead-tin solders, and there is no known limitation on the type of solder used in the soldering process. The lead 14 may be dipped into the solder, or the solder may be brushed onto the lead, or any other appropriate form of application of the solder may be used. After the solder is applied, the lead 14 is cooled to a temperature below the melting point of the solder, and tinning is completed. Tinning is a key step of the soldering of two pieces together, since two tinned pieces can be later joined readily by melting the solder, forcing the tinned portions together, and cooling. As used herein, the term "piece" means any two articles to be joined together, and can include a packaged electronic component, bare wires, bus bars, printed wiring boards, and the like.

Figure 2:
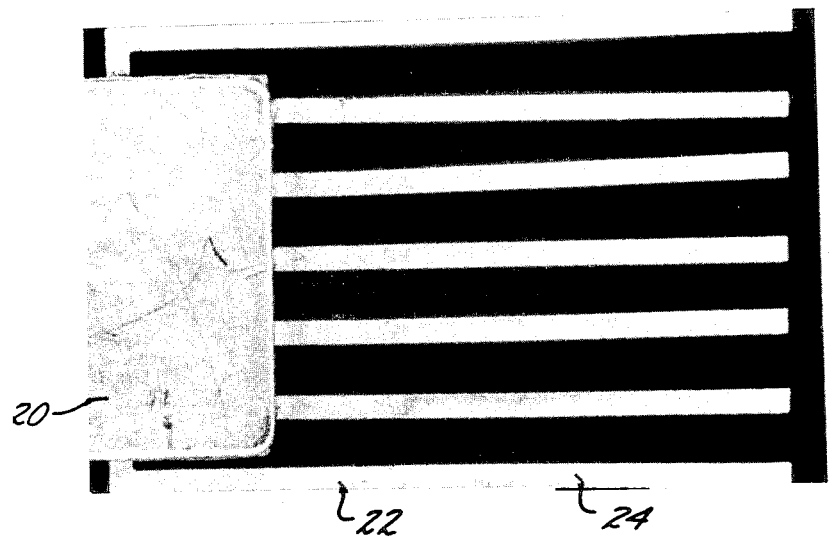
FIG. 2 is a photomicrograph illustrating the metal surface of a portion of a piece tinned according to the present invention.

FIG. 2 is a photomicrograph of a component 20 having gold plated kovar leads 22 that have been fluxed in accordance with the preferred embodiment of the present invention, and tinned by immersion for 3 seconds with gentle circular motion in a pot of a conventional 63 weight percent tin, 37 weight percent lead solder. The tinned region is uniform and without unwetted portions, having a regular solder layer 24 of generally uniform thickness and acceptable metallurgical structure. The tinning process is readily repeatable, and produces the same type of uniform layer 24 over widely varying application conditions.

Figure 3:
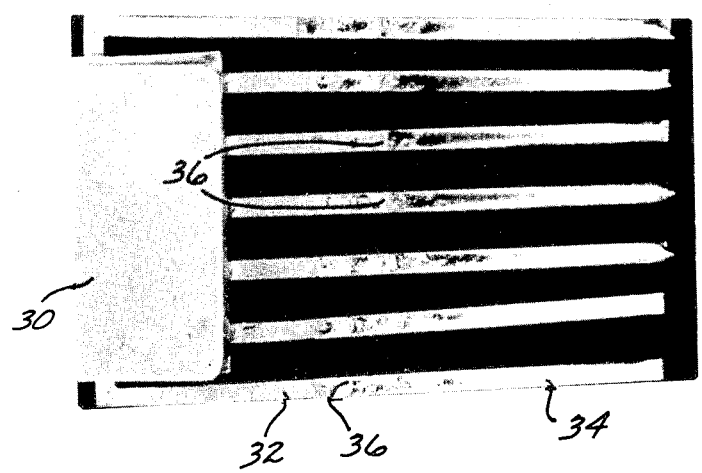
FIG. 3 is a photomicrograph illustrating the metal surface of a portion of a piece tinned according to a prior process.

By contrast, FIG. 3 is a photomicrograph of a similar component 30 having leads 32 that has been fluxed with the synthetic organic acid hydrazine monobromide and tinned using the procedure just described. The tinned region is not uniform, having an irregular solder layer 34 with an unacceptable metallurgical structure. There are numerous unwetted portions 36 on each of the leads 32. The prior approach produces a lead having irregular tinning, with regions not having any solder at all.

In another preferred embodiment, a flux is prepared by mixing 10 parts of the evaporative organic acid t-crotonic acid and 3 parts of formic acid with an evaporative organic solvent mixture of 16 parts of ethyl alcohol and 4 parts tetrahydrofuran. The ingredients are selected to exclude any contaminants that might not evaporate during and after fluxing. The fluxing results obtained with this mixture are generally comparable with those of the mixture of hydrofluoric acid and ethyl alcohol, although the latter flux produces slightly better results and is preferred.

The following examples illustrate aspects of the invention, and should not be taken as limiting the invention in any respect.

A rating system was developed to provide a quantitative rating for the operability of different types of fluxes. Each of five types of electronic component pieces were evaluated, a flatpack, a capacitor, a resistor, a diode, and a transistor. For each of these components, each of three characteristics were evaluated, wetting, shine of the tinned portion, and residue remaining after tinning. An excellent result rated 10 points, a fair result rated 5 points, and a poor result rated 0 points. A maximum possible score for each example was 150 points.

In performing the following examples, the indicated flux was prepared. The component piece was not cleaned prior to dipping into the flux. The component leads were dipped into a beaker of the flux for about 1 second, the time required to immerse the lead to its greatest extent, and then removed from the beaker. The lead was then tinned by dipping into a solder pot containing 63:37 tin:lead solder, for 3 seconds, and removed so that the solder could solidify. The component was then evaluated according to the described rating scale.

EXAMPLE 1

The flux was prepared as 2 parts hydrofluoric acid, 46 parts ethyl alcohol. The rating was 150.

EXAMPLE 2

The flux was prepared as 1 part hydrofluoric acid, 46 parts ethyl alcohol. The rating was 140.

EXAMPLE 3

The flux was prepared as 0.5 parts hydrofluoric acid, 46 parts ethyl alcohol. The rating was 135.

EXAMPLE 4

The flux was prepared as 5 parts hydrofluoric acid, 46 parts ethyl alcohol. The rating was 150.

EXAMPLE 5

The flux was prepared as 10 parts hydrofluoric acid, 46 parts ethyl alcohol. The rating was 150.

Examples 1–5 demonstrate that decreasing the hydrofluoric acid content below about 1 part to 46 parts of evaporative organic solvent, where no other additions are used, reduces the effectiveness of the flux. Increasing the hydrofluoric acid above 2 parts to 46 parts of solvent does not increase effectiveness.

EXAMPLE 6

The flux was prepared as 0.5 parts hydrofluoric acid, 1 part formic acid, and 46 parts ethyl alcohol. The rating was 145.

EXAMPLE 7

The flux was prepared as 0.5 parts hydrofluoric acid, 1.5 parts formic acid, and 46 parts ethyl alcohol. The rating was 150.

EXAMPLE 8

The flux was prepared as 1 part hydrofluoric acid, 1.5 parts formic acid, and 46 parts ethyl alcohol. The rating was 150.

Examples 3 and 6–8 demonstrate that the lower limit of effectiveness of the hydrofluoric acid addition can be lowered by the addition of another acid, in this case formic acid, in a sufficient amount. This lowering of the minimum hydrofluoric acid content is within the scope of the term "about" as used herein in this context.

EXAMPLE 9

The flux was prepared as 2 parts hydrofluoric acid, 46 parts acetone. The rating was 145.

EXAMPLE 10

The flux was prepared as 2 parts hydrofluoric acid, 46 parts ethyl acetate. The rating was 150.

EXAMPLE 11

The flux was prepared as 2 parts hydrofluoric acid, 46 parts isopropyl alcohol. The rating was 145.

EXAMPLE 12

The flux was prepared as 2 parts hydrofluoric acid, 46 parts TMEK. The rating was 145.

EXAMPLE 13

The flux was prepared as 2 parts hydrofluoric acid, 26 parts hexane, 20 parts ethyl alcohol. The rating was 145.

Examples 9–13 demonstrate that other evaporative organic solvents are operable, and that mixtures of evaporative organic solvents are operable.

EXAMPLE 14

The flux was prepared as 5 parts hydrochloric acid, 10 parts ethyl alcohol, 36 parts Freon TE. The rating was 115.

EXAMPLE 15

The flux was prepared as 5 parts hydrofluoric acid, 10 parts ethyl alcohol, 36 parts Freon TE. The rating was 145.

EXAMPLE 16

The flux was prepared as 0.5 parts hydrochloric acid, 1.5 parts formic acid, 46 parts ethyl alcohol. The rating was 120.

EXAMPLE 17

The flux was prepared as 10 parts hydrobromic acid, 46 parts ethyl alcohol. The rating was 130.

EXAMPLE 18

The flux was prepared as 10 parts hydroiodic acid, 46 parts ethyl alcohol. The rating was 120.

EXAMPLE 19

The flux was prepared as 1.5 parts hydrofluoric acid, 0.5 parts hydrobromic acid, and 46 parts ethyl alcohol. The rating was 145.

Examples 14–19 demonstrate that fluxes formed from acids other than hydrofluoric acid are not as effective.

EXAMPLE 20

The flux was prepared as 5 parts t-crotonic acid, 50 parts isopropyl alcohol, and 50 parts ethyl acetate. The rating was 145.

EXAMPLE 21

The flux was prepared as 45 parts t-crotonic acid, 50 parts isopropyl alcohol, and 50 parts ethyl acetate. The rating was 145.

EXAMPLE 22

The flux was prepared as 2.5 parts t-crotonic acid, 46 parts ethyl alcohol, 4 parts tetrahydrofuran, 1.5 parts formic acid, and 5 parts hydrofluroic acid. The rating was 150.

EXAMPLE 23

The flux was prepared as 5 parts t-crotonic acid, 10 parts isoamyl acetate, and 10 parts polyethylene glycol having a molecular weight of about 300. The rating was 150.

Thus, it is seen that the flux and approach of the present invention yield important advantages in soldering. Good tinning and soldering are achieved, without the need for cleaning and postcleaning. The flux is non-toxic, and can be used in production operations where hand wiring is done.

Although a particular embodiment of the invention has been described in detail for purposes of illustration, various modifications may be made without departing from the spirit and scope of the invention. Accordingly, the invention is not to be limited except as by the appended claims.

What is claimed is:

1. A soldering flux, consisting essentially of a mixture of an evaporative organic solvent and an acid selected from the group consisting of hydrofluoric acid and an evaporative organic acid, the acid being present in an effective amount less than the solubility limit in the evaporative organic solvent.

2. The flux of claim 1, wherein the acid is hydrofluoric acid, and the ratio of hydrofluoric acid to evaporative organic solvent is from about 1 to about 10 parts of hydrofluoric acid, to about 46 parts of evaporative organic solvent.

3. The flux of claim 1, wherein the acid is hydrofluoric acid, and the ratio of hydrofluoric acid to evaporative organic solvent is about 2 parts of hydrofluoric acid to about 46 parts of evaporative organic solvent.

4. The flux of claim 1, wherein the acid is the evaporative organic acid t-crotonic acid.

5. The flux of claim 1, wherein the evaporative organic solvent is selected from the group consisting of isopropyl alcohol, ethyl alcohol, methyl alcohol, tetrahydrofuran, acetone, ethyl acetate, freon TE, ethyl formate, TMEK, hexane, methylene chloride, isoamyl acetate, benzene, toluene, cyclohexanone, and mixtures thereof.

6. The flux of claim 1, further including an inorganic acid.

7. The flux of claim 1, further including an acid selected from the group consisting of hydrobromic acid, hydroiodic acid, and hydrochloric acid, and mixtures thereof.

8. The flux of claim 1, further including an organic acid.

9. The flux of claim 1, wherein the flux is a mixture of about 2 parts of hydrofluoric acid in about 46 parts of ethyl alcohol.

10. A method for fluxing the surface of a portion on a piece, comprising the steps of:
furnishing a piece to be fluxed;
contacting the portion to be fluxed to a solution consisting essentially of a mixture of an evaporative organic solvent and an acid selected from the group consisting of hydrofluoric acid and an evaporative organic acid, the acid being present in an effective amount less than the solubility limit in the evaporative organic solvent; and
heating the contacted portion to a temperature at which the hydrofluoric acid reacts with the oxides on the surface, and the solution evaporates.

11. The method of claim 10, wherein the acid is hydrofluoric acid, and the ratio of hydrofluoric acid to evaporative organic solvent is from about 1 to about 10 parts of hydrofluoric acid, to about 46 parts of evaporative organic solvent.

12. The method of claim 10, wherein the acid is hydrofluoric acid, and the ratio of hydrofluoric acid to evaporative organic solvent is about 2 parts of hydrofluoric acid, to about 46 parts of evaporative organic solvent.

13. The flux of claim 10, wherein the acid is the evaporative organic acid t-crotonic acid.

14. A piece having a portion fluxed by the method of claim 10.

15. A method for joining portions of two pieces, comprising the steps of:
furnishing the two pieces to be joined;
contacting the portions to be joined to a solution consisting essentially of a mixture of an evaporative organic solvent and an acid selected from the group consisting of hydrofluoric acid and an evaporative organic acid, the acid being present in an effective amount less than the solubility limit in the evaporative organic solvent;
applying a metallic solder to at least one of the portions to be joined to tin the portion at a temperature above the melting temperature of the solder; and
contacting the two portions to be joined at a temperature above the melting point of the metallic solder and then cooling the contacted portions to a temperature below the melting point of the metallic solder, thereby joining the contacted portions together, said method being accomplished without any postcleaning of the joined components.

16. The method of claim 15, wherein at least one of the pieces is an electronic component.

17. The method of claim 15, wherein the acid is hydrofluoric acid, and the ratio of hydrofluoric acid to evaporative organic solvent is about 2 parts of hydrofluoric acid, to about 46 parts of evaporative organic solvent.

18. The method of claim 15, wherein the acid is hydrofluoric acid and the evaporative organic solvent is ethyl alcohol.

* * * * *